(12) United States Patent
Embleton et al.

(10) Patent No.: US 11,337,276 B2
(45) Date of Patent: May 17, 2022

(54) ENVIRONMENTAL MANAGEMENT BASED ON TEMPORAL AND SPATIAL PREDICITONS

(71) Applicant: Dell Products L.P., Round Rock, TX (US)

(72) Inventors: Steven Embleton, Austin, TX (US); Eric Michael Tunks, Austin, TX (US); Brian M. Hahn, Georgetown, TX (US); Chris M. Helberg, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 16/749,478

(22) Filed: Jan. 22, 2020

(65) Prior Publication Data

US 2021/0227636 A1 Jul. 22, 2021

(51) Int. Cl.
*G05D 23/00* (2006.01)
*H05B 1/02* (2006.01)
(Continued)

(52) U.S. Cl.
CPC ............ *H05B 1/0275* (2013.01); *F24F 11/30* (2018.01); *G05B 19/042* (2013.01); *G06N 5/02* (2013.01); *H05B 1/0294* (2013.01); *H05B 3/342* (2013.01); *F24F 11/62* (2018.01); *G05B 13/02* (2013.01); *G05B 2219/2614* (2013.01); *G05D 23/1919* (2013.01); *G06Q 30/0601* (2013.01)

(58) Field of Classification Search
CPC ... B60H 1/2225; G06Q 30/0601; F24F 11/62; F24F 11/30; G05D 23/1919; G05B 13/026; G05B 13/02; G05B 19/042; G05B 2219/2614; H04W 4/029; B60L 3/12; H05B 1/0294; H05B 3/342; H05B 1/0275; G06N 5/02
See application file for complete search history.

(56) References Cited

U.S. PATENT DOCUMENTS

| | | | | |
|---|---|---|---|---|
| 8,600,561 B1 * | 12/2013 | Modi | ................. | G05D 23/1919 700/276 |
| 2009/0179080 A1 * | 7/2009 | Alston | ................. | B60H 1/2225 237/28 |

(Continued)

*Primary Examiner* — Tuan A Vu
(74) *Attorney, Agent, or Firm* — Jackson Walker L.L.P.

(57) ABSTRACT

An apparatus may include an enclosure that includes a plurality of mounting features that are configured to receive information handling systems; one or more environmental sensors configured to determine environmental conditions associated with the enclosure; a position sensor configured to determine a geodetic location of the enclosure; a heater configured to heat the enclosure; and a heater control system. The heater control system may be configured to: receive information regarding an origin for the enclosure, a destination for the enclosure, and a desired destination temperature for the enclosure; establish a model for the enclosure, wherein the model incorporates data from the one or more environmental sensors and data from the position sensor; and based on the model, predictively determining control parameters for the heater configured to cause the enclosure to reach the desired destination temperature at or before a time of arrival at the destination.

20 Claims, 6 Drawing Sheets

(51) Int. Cl.
  *G06N 5/02*     (2006.01)
  *H05B 3/34*     (2006.01)
  *G05B 19/042*     (2006.01)
  *F24F 11/30*     (2018.01)
  *G06Q 30/06*     (2012.01)
  *G05B 13/02*     (2006.01)
  *F24F 11/62*     (2018.01)
  *G05D 23/19*     (2006.01)

(56) References Cited

U.S. PATENT DOCUMENTS

| | | | |
|---|---|---|---|
| 2012/0065783 A1* | 3/2012 | Fadell | F24F 11/62 |
| | | | 700/276 |
| 2013/0073094 A1* | 3/2013 | Knapton | G05B 13/02 |
| | | | 700/278 |
| 2013/0190940 A1* | 7/2013 | Sloop | G05B 13/026 |
| | | | 700/291 |
| 2017/0051934 A1* | 2/2017 | Verhoeven | F24F 11/30 |
| 2018/0134171 A1* | 5/2018 | Hyde | B60L 3/12 |
| 2019/0372345 A1* | 12/2019 | Bain | G06Q 30/0601 |
| 2020/0408546 A1* | 12/2020 | Vaughn | H04W 4/029 |

* cited by examiner

ENVIRONMENTAL MANAGEMENT BASED ON TEMPORAL AND SPATIAL PREDICITONS

TECHNICAL FIELD

The present disclosure relates in general to information handling systems, and more particularly to the transportation of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various problems are known in the field of transportation and delivery of information handling systems, particularly in the enterprise context of rack-mounted systems including a plurality of standard-sized server information handling systems.

Some embodiments of the present application may be used in the context of shippable "totes" as discussed in U.S. application Ser. No. 16/681,336, filed Nov. 12, 2019, which is incorporated by reference herein in its entirety. Other embodiments of this application may be used in the context of standard rack shipping solutions.

The present application addresses more specifically the problem that if equipment is cold when it arrives at a datacenter, exposure to moist warm air can cause condensation, which may damage the equipment and could cause catastrophic failure of the equipment if it is turned on too soon. For example, it may be desirable to warm the equipment to the ambient temperature of the datacenter. In other cases, it may be desirable to warm the equipment to at least the dew point. Current remediation methods include waiting for the equipment to warm, but it is difficult to predict how much delay is required. Customers may wait two to three days, with packaged racks sitting unused in their datacenters, for them to warm up. This imposes time, space, logistics, and trash management constraints on the customer.

When transporting a product, the rate at which equipment can be warmed is limited, and the thermal mass of the equipment may require a long time for the internal temperature to become stable. To reduce the customer wait time, climate controlled trucks may be used on high-risk deployments (e.g., during winter). But climate controlled trucks increase the transportation cost significantly due to their high demand and low availability.

Accordingly, embodiments of this disclosure may improve on existing solutions by allowing equipment to arrive at its destination pre-warmed, but without the need for climate controlled trucks. Such equipment may be installed and powered up immediately instead of waiting for it to reach the temperature of the datacenter. In other situations, embodiments of this disclosure may be used within a climate controlled truck (e.g., using the climate control of the truck to provide some portion of the warming).

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with transportation of information handling systems may be reduced or eliminated.

In accordance with embodiments of the present disclosure, an apparatus may include an enclosure that includes a plurality of mounting features that are configured to receive information handling systems; one or more environmental sensors configured to determine environmental conditions associated with the enclosure; a position sensor configured to determine a geodetic location of the enclosure; a heater configured to heat the enclosure; and a heater control system. The heater control system may be configured to: receive information regarding an origin for the enclosure, a destination for the enclosure, and a desired destination temperature for the enclosure; establish a model for the enclosure, wherein the model incorporates data from the one or more environmental sensors and data from the position sensor; and based on the model, predictively determining control parameters for the heater configured to cause the enclosure to reach the desired destination temperature at or before a time of arrival at the destination.

In accordance with these and other embodiments of the present disclosure, a method may include a heater control system receiving information regarding an origin for an enclosure configured to receive information handling systems therein, a destination for the enclosure, and a desired destination temperature for the enclosure; the heater control system establishing a model for the enclosure, wherein the model incorporates data from one or more environmental sensors of the enclosure and data from a position sensor of the enclosure; based on the model, the heater control system predictively determining control parameters for a heater of the enclosure configured to cause the enclosure to reach the desired destination temperature at or before a time of arrival at the destination; and the heater control system causing the heater to operate in accordance with the control parameters.

In accordance with these and other embodiments of the present disclosure, an article of manufacture may include a non-transitory, computer-readable medium having computer-executable code thereon that is executable by a processor of a heater control system for: receiving information regarding an origin for an enclosure configured to receive information handling systems therein, a destination for the enclosure, and a desired destination temperature for the enclosure; establishing a model for the enclosure, wherein the model incorporates data from one or more environmental sensors of the enclosure and data from a position sensor of the enclosure; and based on the model, predictively determining control parameters for a heater of the enclosure configured to cause the enclosure to reach the desired destination temperature at or before a time of arrival at the destination.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
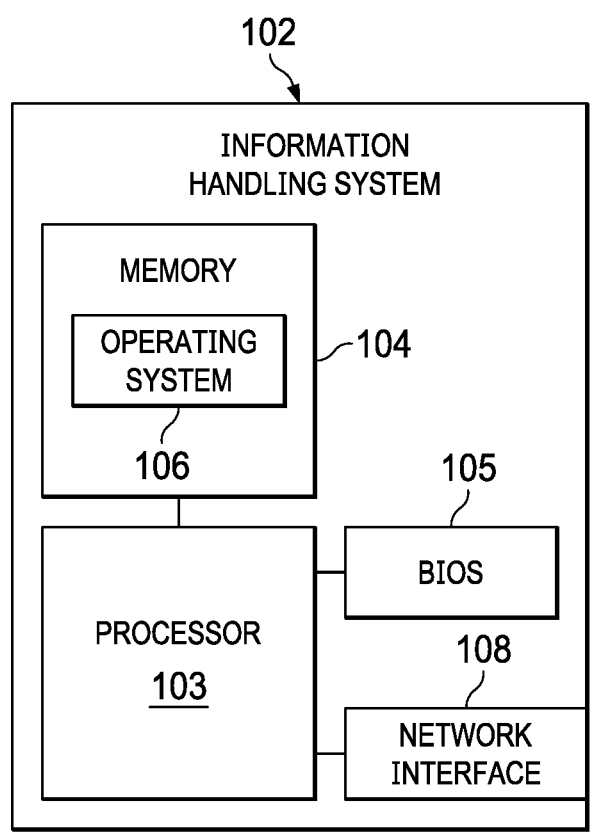
FIG. 1 illustrates a block diagram of an example information handling system, in accordance with embodiments of the present disclosure.

Preferred embodiments and their advantages are best understood by reference to FIGS. 1 through 6, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, various problems are known in the field of temperature control during transportation and delivery of information handling systems (e.g., information handling system 102).

Figure 2:
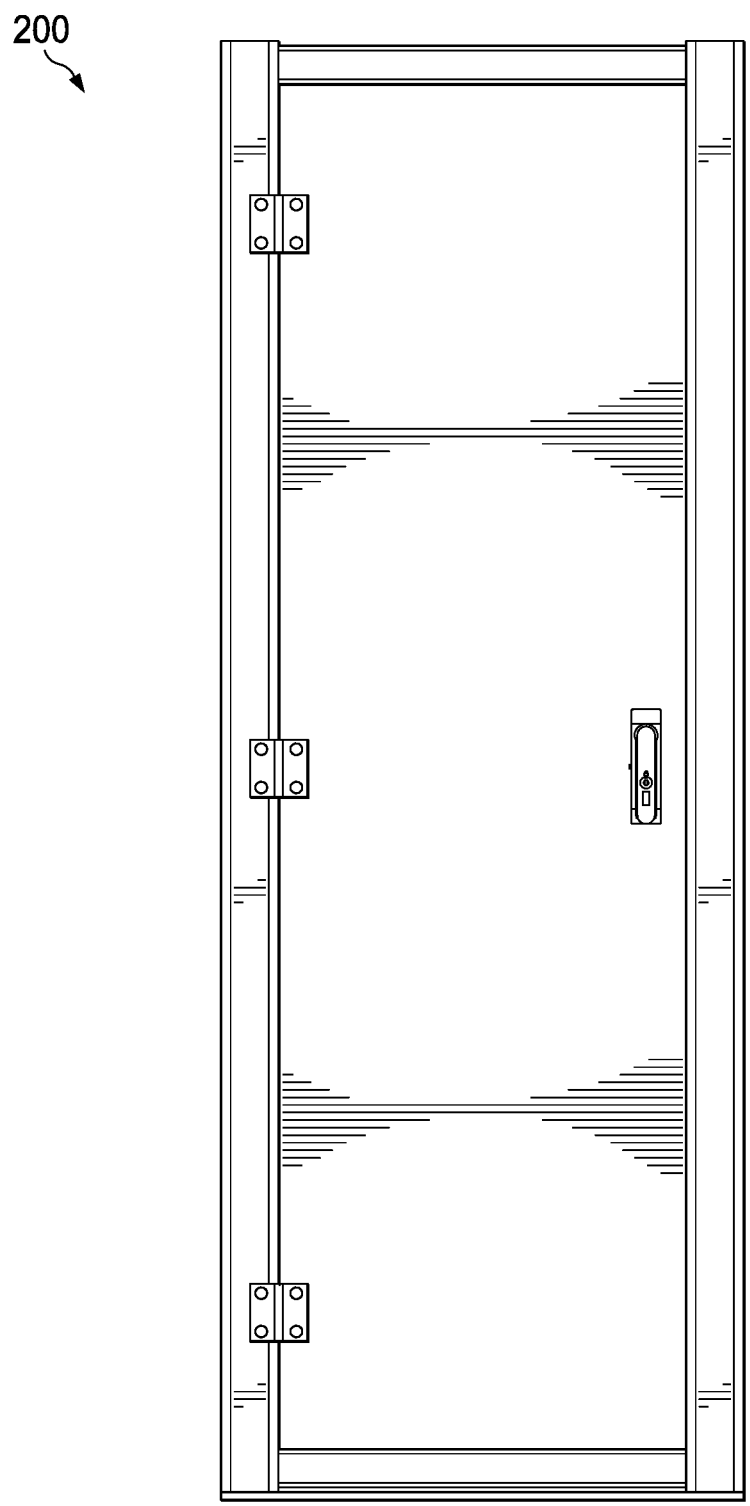
FIG. 2 illustrates a front view of an example transportation apparatus, in accordance with embodiments of the present disclosure.

Turning now to FIG. 2, a front view is shown of an example information handling system enclosure 200. As noted above, other embodiments of this disclosure may use wheeled totes of the type described in more detail in U.S. application Ser. No. 16/681,336. In yet other embodiments, a standard rack shipping solution may also be used (e.g., with a box or enclosure surrounding such rack shipping solution). In other embodiments, an enclosure may include an environmentally isolated load such as one or more stacks of server boxes on a wood pallet, which may be wrapped in insulation (e.g., a heating blanket, which may provide both insulation and a method for controlling the temperature). In still other embodiments, a truck or shipping container itself may be considered an enclosure and may contain non-rack-mounted equipment such as laptops, desktops, other types of information handling systems, and/or information handling resources such as internet-of-things (IOT) hardware, hard drives, monitors, etc. Regardless of the details of the enclosure, the teachings of this disclosure may be applied to cause the contents of the enclosure to reach a desired temperature at (or shortly before) the time of delivery at a shipping destination.

Enclosure 200 may include a rack (not explicitly shown in this view) for receiving a plurality of information handling systems such as information handling system 102. For example, mounting features of such a rack may include rails, shelves, or any other suitable hardware for securely attaching and/or retaining information handling systems.

In some embodiments, the rack may be manufactured according to a standard such as EIA-310, which defines standard rack unit sizing. In other embodiments, different sizes may be used, such as 21-inch server equipment, laptops, desktops, other types of information handling systems, or information handling resources such as internet-of-things (IOT) hardware, hard drives, monitors, etc.

Enclosure 200 may also include a heater for bringing its contents to a desired temperature. For example, a thermal blanket may be placed around the equipment as a heater. Such a heater may prevent water from condensing on the contents of enclosure 200, as an increase in temperature may cause a decrease in relative humidity. Further, if some water has already condensed on such contents, the heater may cause such condensation to evaporate.

In some embodiments, enclosure 200 may include a battery for powering the heater as well as other components described below. In these and other embodiments, enclosure 200 may include a power input terminal for powering a battery and/or powering the heater and other components directly.

Enclosure 200 may further include control circuitry (e.g., a heater control system, which may be implemented as an information handling system). As described in more detail below, such a heater control system may determine control parameters for controlling the heater, cause the heater to be activated in accordance with such control parameters (e.g., at one or more desired times and at one or more desired power levels).

In these and other embodiments, enclosure 200 may include one or more environmental sensors (e.g., temperature sensors, humidity sensors, etc., which may be coupled to the heater control system via USB or any other suitable method). For example, enclosure 200 may include a plurality of such sensors disposed at different locations within. The signals from such environmental sensors may provide details regarding the environmental conditions within enclosure 200, allowing an accurate model to be established for control of the heater.

Enclosure 200 may further include one or more position sensors such as a GPS receiver, a 4G modem, etc. Such a position sensor may allow the heater control system to determine the geodetic location of enclosure 200, which may aid in determining remaining travel time.

Enclosure 200 may further include a network interface (e.g., typically a wireless interface such as a 4G modem or the like). As described herein, the heater control system may use such a network interface to access updated information such as traffic, travel routing, weather, and any other information that may be useful in determining heater control parameters.

In general, as discussed in more detail below, knowledge of the route, destination, delivery time, ambient weather, etc. may be used by the heater control system to create a custom warming profile for the equipment inside enclosure 200 during transportation. Embodiments may efficiently use the power supplied by an internal battery or by the shipping truck or shipping container to warm enclosure 200 only when required, saving energy compared to a pure closed loop system. Embodiments may also be able to initiate warming proactively (e.g., before a closed loop threshold was passed) in the event that enclosure 200 will require warming before reaching its destination. Further, as one of ordinary skill in the art with the benefit of this disclosure will appreciate, heating elements may have a ramp-up time before reaching steady state. Using a predictive algorithm, efficiency may be improved by operating in steady-state for as long as possible.

Figure 3:
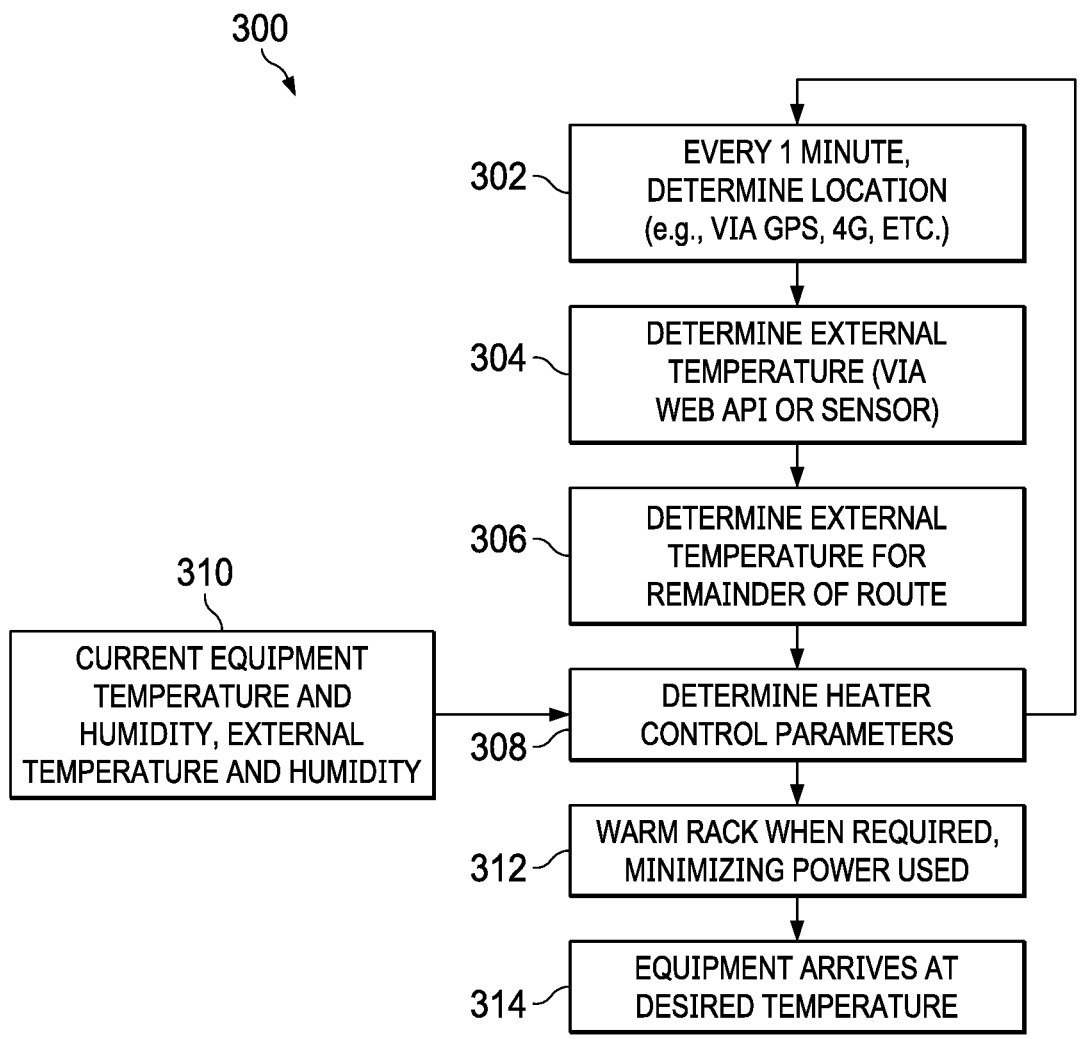
FIG. 3 illustrates a flow chart of a method, in accordance with embodiments of the present disclosure.

Turning now to FIG. 3, a flow chart of an example method for environmental management is shown, in accordance with some embodiments. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At the outset of method 300, a rack of information handling systems may be prepared for shipment via truck, shipping container, or any other suitable method. A heater control system as described above may be programmed with information such as the origin, the destination, the estimated arrival time, etc.

At step 302, a prediction loop may begin which may be repeated at predetermined intervals (e.g., once per minute) throughout the transit. The heater control system may first determine its current location by polling a position sensor such as a GPS receiver, a 4G connection, etc.

At step 304, the heater control system may determine the external temperature at or near its present location. This may be accomplished via a network interface (e.g., via a web API) or via one or more environmental sensors disposed outside the truck or shipping container.

At step 306, the heater control system may further determine the predicted external temperature for the remainder of the transit route. This determination may also rely on information such as current traffic patterns, predicted traffic patterns along the planned transit route, predicted changes to the transit route based on traffic or other concerns, etc. In some embodiments, the heater control system may also update such information so that in each loop iteration, the best and most current information may be used for the remainder of the algorithm.

At step 308, heater control parameters may be determined. As shown, this determination may also rely on the current environmental state (e.g., temperature and humidity) both internally and externally. In some embodiments, the heater control parameters may be determined to minimize the total power consumption subject to the constraint that the equipment needs to be at a desired temperature at the estimated arrival time. For example, the heater control parameters may include a determination that at some selected future time $T_0$, the heater should be activated at full power and remain on until the estimated time of arrival $T_1$.

Various embodiments for determining the value of $T_0$ will be appreciated by one of ordinary skill in the art with the benefit of this disclosure. As one example, the heater control system may perform model calculations (e.g., based on a standard control-theory type of model for the enclosure). The model calculations may take into account factors such as the thermal mass of the enclosure and its contents, the type and number of devices inside the enclosure, the maximum heat output of the heater, the ambient weather conditions along the planned travel route, etc.

As described in further detail below, such a calculation may, in some cases, operate by running a model simulation in which the heater is activated some number of minutes before the predicted arrival time. That number may then be successively increased (e.g., in a for-loop) until the desired result is achieved.

After completion of step 308, method 300 may loop back to step 302, wait a selected amount of time (e.g., 60 seconds), and then execute the prediction loop again.

Once the current time has reached the selected time indicated by the determined heater control parameters, at step 312, the method may activate the heater and begin warming the rack. At step 314, the equipment arrives at its destination at the desired temperature.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 and/or any other system operable to implement method 300. In certain embodiments, method 300 may be implemented partially or fully in software and/or firmware embodied in computer-readable media.

In these and other embodiments, an example of Python-style pseudocode for implementing some of the functionality of a heater control system may be as shown below at Listing 1.

Listing 1.

```
city_state=input("Please enter destination city/state in the
   format <city, state>: ")
datetime=input("Please enter delivery datetime in the format
   <YYYY-MM-DD HH:mm:ss>: ")
dest_loc=get_loc_for_city_state_from_api(city_state)
# loc={latitude, longitude}
curr_loc=get_current_loc_from_api( )
route_locs=calculate_route(curr_loc, dest_loc)
# array of coordinates {latitude, longitude}
# calculated between currentlog and dest_loc
While True:
    # Read the following (e.g., from web APIs
    # or from environmental sensors)
    curr_loc=get_current_loc_from_api( )
    curr_env_temp=get_current_external_temp_from_api( )
    curr_env_humidity=get_current_humidity_from_api( )
    curr_rack_temp=get_current_rack_temp( )
    curr_rack_humidity=get_current_rack_humidity( )
    temp_humidity_delta=calculate_temp_delta(current_loc,
route_locs, curr_env_temp, curr_rack_temp,
curr_env_humidity, curr_rack_humidity)
    # delta is the difference between current temperature
    # and desired temperature
    if temp_humidity_delta > 0
        heat_rack(temp_humidity_delta)
        # ramp up the temperature of the rack
        # rack to match estimated desired temperature
    Time.sleep(60)
```

In these and other embodiments, an example calculation for determining the rack temperature as a function of ambient temperature and applied heat may proceed as follows. In the following discussion, these variable definitions may be used:

t:=time step
$T_{sys}$:=rack or system temperature
$T_{ext}$:=ambient or external temperature
$T_{crit}$:=threshold or critical temperature
k:=thermal constant (measured or derived)
P:=heating power
$C_p$:=specific heat
$m_{sys}$:=rack or system mass With these definitions in mind, the controlling equation may be as follows.

$$T_{sys}[i] = T_{ext}[i-1] + (T_{sys}[i-1] - T_{ext}[i-1])e^{-kt} + \frac{Pt}{C_p m_{sys}}$$

Accordingly, a loop may be executed to determine the optimal time at which to activate the heater:

1. Determine the ambient temperature, $T_{ext}$, as a function of time.
2. Calculate the system temperature, $T_{sys}$, as a function of time, with no heating power applied.
3. Heating is required if the final system temperature is below a defined threshold or critical temperature, $T_{sys} \leq T_{crit}$.
4. From the expected delivery time, step back by t. Add heating power into the system and calculate the final system temperature $T_{sys}$.
5. Continue stepping back by t until the final system temperature is greater than or equal to the critical temperature, $T_{sys} \geq T_{crit}$.

In this way, an optimal time for activating the heater may be determined. The heater may then be activated at (or in some embodiments, shortly before) such time.

The equation above describes a situation in which the power dissipated by the heater is all absorbed by the equipment, and is absorbed on a short timescale. For example, a heater that is disposed within an insulated enclosure along with all of the other equipment would be well-described by such an equation.

However, in embodiments in which the heater is disposed outside the enclosure (e.g., a heating blanket wrapped around an enclosure), a significant portion of the heater's power may not be absorbed by the equipment, but may be lost to the environment. Thus in such embodiments, an equation may be used which also takes into account additional physical features such as the thermal resistance between the heater and the enclosure, the temperature reached by the heater itself, etc. One of ordinary skill in the art with the benefit of this disclosure will readily appreciate how different mathematical models and equations may be tailored to suit a given situation.

Figure 4:
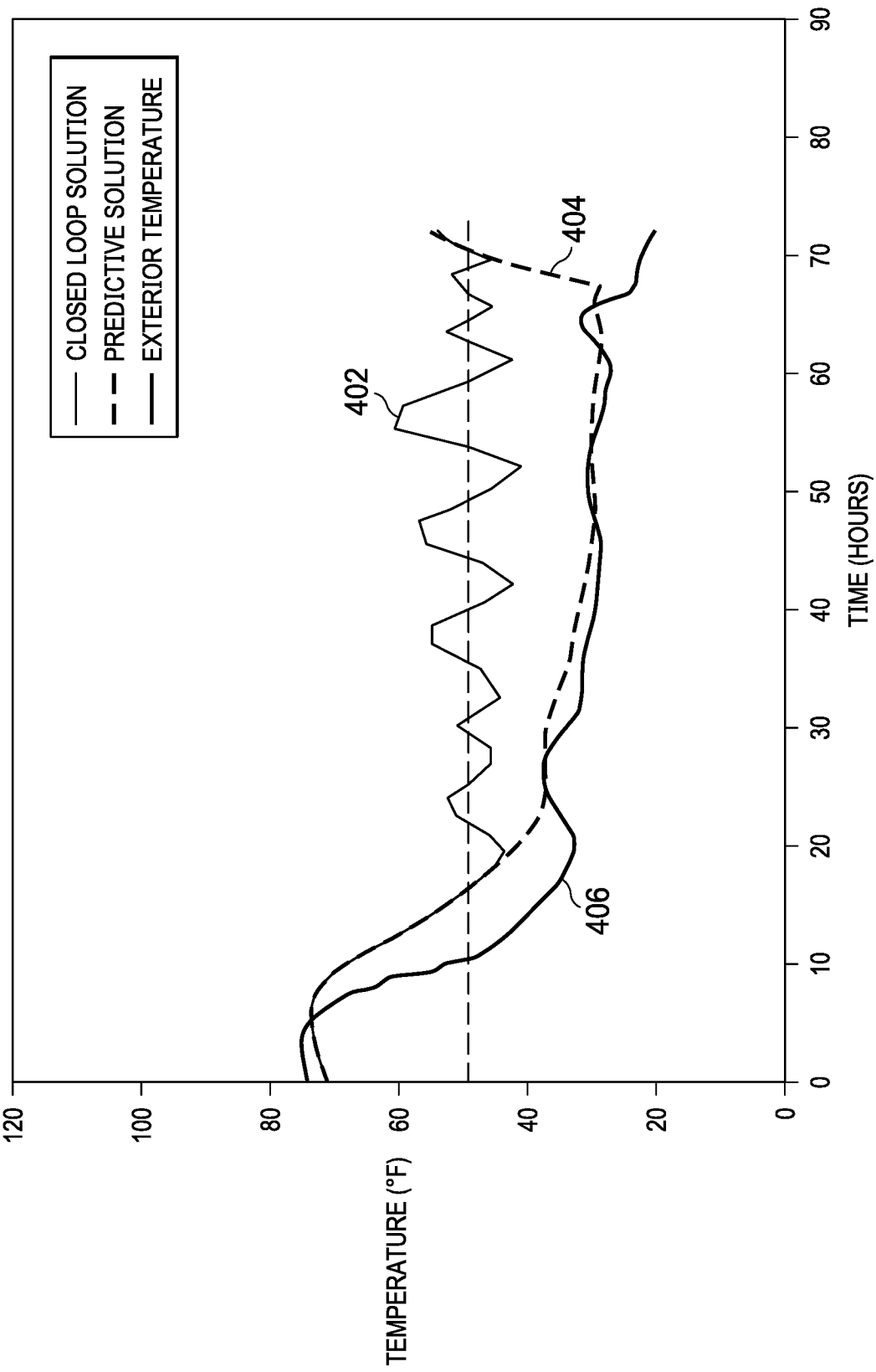
FIGS. 4-6 illustrate various graphs of temperature versus time, in accordance with embodiments of the present disclosure.
Figure 5:
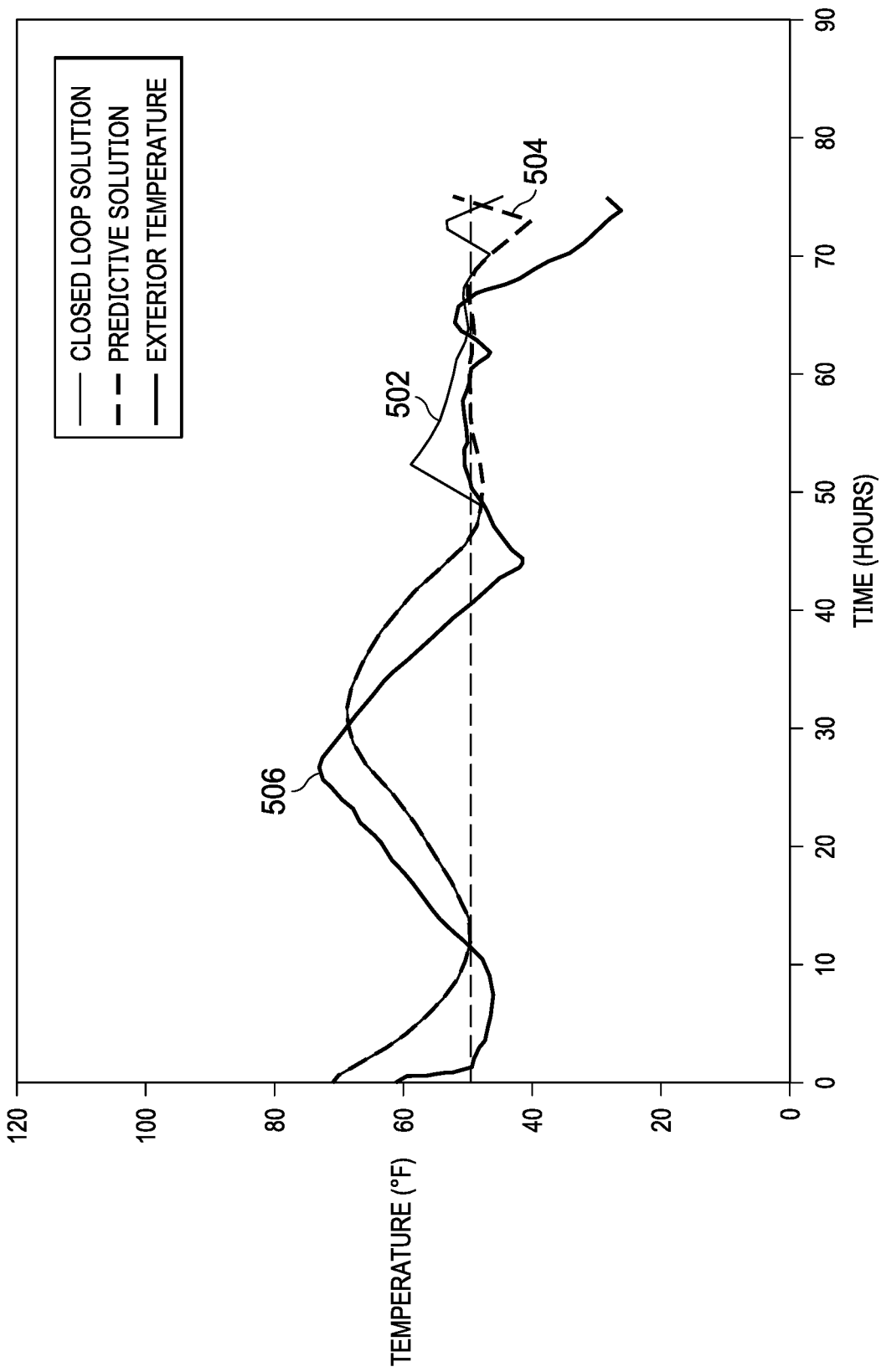
Figure 6:
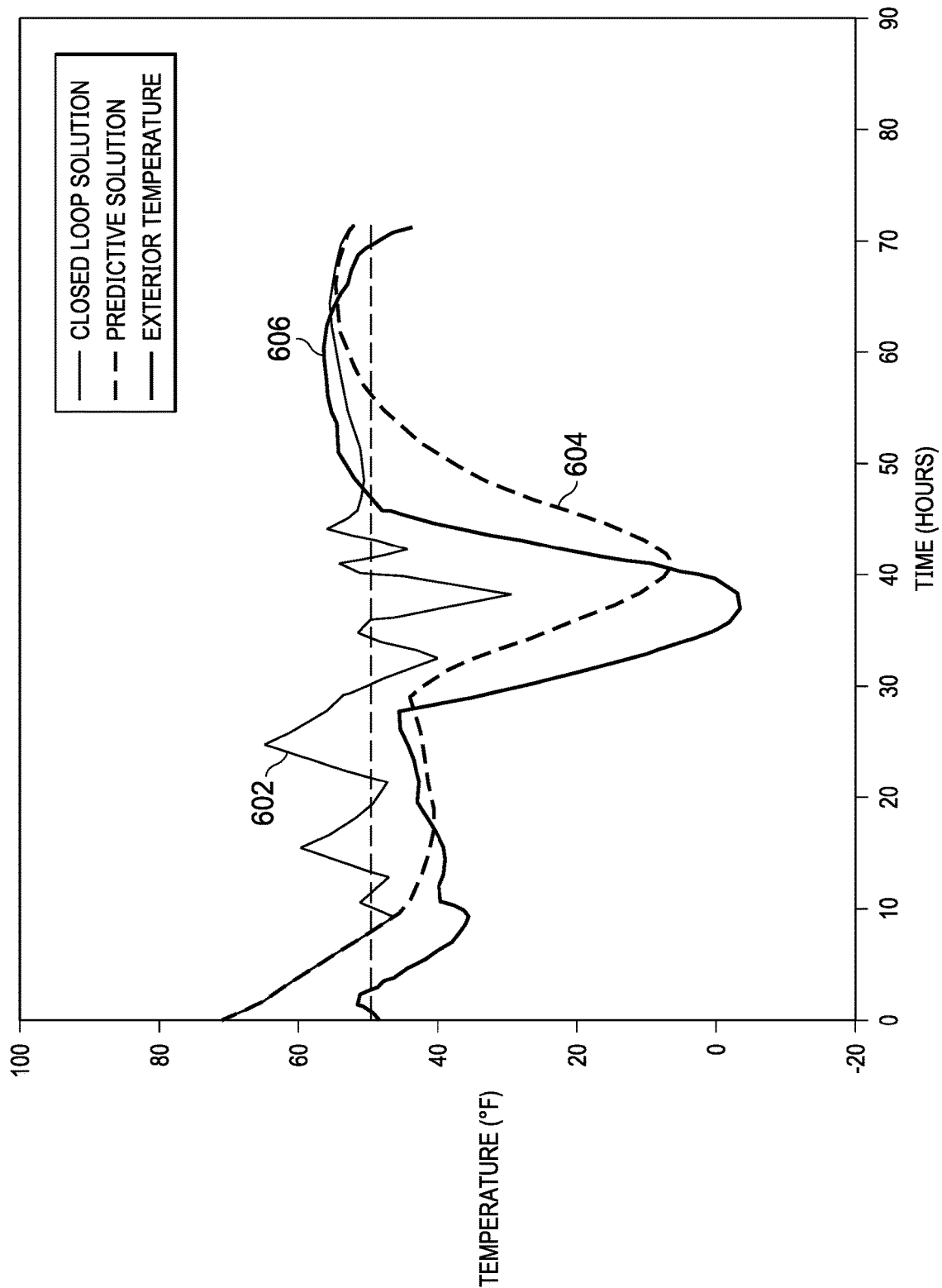

Turning now to FIGS. 4-6, three graphs of temperature versus time are shown comparing embodiments of the present disclosure to prior solutions. In each of these FIGURES, the desired arrival temperature of 50° F. is shown with a horizontal line. Closed loop solutions are shown, in which a control system attempts to maintain the equipment at (or near) the desired temperature at all times during transit. Predictive solutions according to embodiments of this disclosure are also shown, in which a control system attempts to bring the equipment to the desired temperature only at (or shortly prior to) the time of arrival.

In FIG. 4, a long, cold trip is depicted. Closed loop solution 402 does successfully reach the desired temperature at the time of arrival. However, maintaining the equipment at that elevated temperature for the entire transit is a waste of energy. For example, closed loop solution 402 requires an energy input of 18 kWh. Predictive solution 404 according to the present disclosure also reaches the desired temperature at the time of arrival, but it requires an energy input of only 6 kWh. That is, predictive solution 404 may rely on predicted information about the trip, the exterior temperature 406 at various future times, and various other factors in determining when to activate a heater.

In FIG. 5, closed loop solution 502 fails to reach the desired temperature at the time of arrival. Such a thermostat-style closed loop solution may continually oscillate between being too warm and too cold, and thus it is susceptible to being below the desired temperature at any given point. In this example, the timing is such that the equipment is too cold when it arrives. Predictive solution 504 according to the present disclosure reaches the desired temperature at (or shortly before) the time of arrival.

In FIG. 6, closed loop solution 602 does successfully reach the desired temperature at the time of arrival, but as in FIG. 4, it wastes significant energy (18.5 kWh in this example) in doing so. Predictive solution 604 according to the present disclosure also reaches the desired temperature at the time of arrival, but it achieves this result without expending any heating energy at all. That is, predictive solution 604 may rely on predicted information to determine that the equipment will be warmed sufficiently by the ambient weather conditions, and that no additional heating is needed.

One of ordinary skill in the art will readily appreciate various other situations in which a predictive system according to the present disclosure provides advantages over existing solutions.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:
1. An apparatus comprising:
an enclosure that includes a plurality of mounting features that are configured to receive information handling systems;

one or more environmental sensors configured to determine environmental conditions associated with the enclosure;
a position sensor configured to determine a geodetic location of the enclosure;
a heater configured to heat the enclosure; and
a heater control system configured to:
receive information regarding an origin for the enclosure, a destination for the enclosure, and a desired destination temperature for the enclosure;
establish a model for the enclosure, wherein the model incorporates data from the one or more environmental sensors and data from the position sensor, and wherein the model further includes weather data regarding predicted weather conditions at a plurality of locations along a planned transit route from the origin to the destination, wherein the predicted weather conditions correspond to respective times that the enclosure is predicted to be located at the respective locations; and
based on the model, predictively determine control parameters for the heater configured to cause the enclosure to reach the desired destination temperature at or before a time of arrival at the destination.

2. The apparatus of claim 1, wherein the one or more environmental sensors includes a temperature sensor.

3. The apparatus of claim 1, wherein the one or more environmental sensors includes a humidity sensor.

4. The apparatus of claim 1, wherein the heater comprises a thermal blanket.

5. The apparatus of claim 1, wherein the position sensor comprises a global positioning system (GPS) receiver.

6. The apparatus of claim 1, further comprising a network interface configured to receive traffic data, wherein the heater control system is further configured to update the model based on the traffic data.

7. The apparatus of claim 1, further comprising a network interface configured to receive updated weather data, wherein the heater control system is further configured to update the model based on the updated weather data.

8. The apparatus of claim 1, wherein the control parameters for the heater are further determined to minimize a power consumption for the heater.

9. The apparatus of claim 1, wherein the control parameters for the heater include a time at which the heater is to be activated.

10. The apparatus of claim 1, further comprising a battery configured to supply electrical power to the heater.

11. The apparatus of claim 1, further comprising a power input terminal configured to supply electrical power to the heater from a shipping truck.

12. A method comprising:
a heater control system receiving information regarding an origin for an enclosure configured to receive information handling systems therein, a destination for the enclosure, and a desired destination temperature for the enclosure;
the heater control system establishing a model for the enclosure, wherein the model incorporates data from one or more environmental sensors of the enclosure and data from a position sensor of the enclosure, and wherein the model further includes weather data regarding predicted weather conditions at a plurality of locations along a planned transit route from the origin to the destination, wherein the predicted weather conditions correspond to respective times that the enclosure is predicted to be located at the respective locations;
based on the model, the heater control system predictively determining control parameters for a heater of the enclosure configured to cause the enclosure to reach the desired destination temperature at or before a time of arrival at the destination; and
the heater control system causing the heater to operate in accordance with the control parameters.

13. The method of claim 12, further comprising transporting the enclosure from the origin to the destination.

14. The method of claim 13, further comprising updating the model periodically during the transporting.

15. An article of manufacture comprising a non-transitory, computer-readable medium having computer-executable code thereon that is executable by a processor of a heater control system for:
receiving information regarding an origin for an enclosure configured to receive information handling systems therein, a destination for the enclosure, and a desired destination temperature for the enclosure;
establishing a model for the enclosure, wherein the model incorporates data from one or more environmental sensors of the enclosure and data from a position sensor of the enclosure, and wherein the model further includes weather data regarding predicted weather conditions at a plurality of locations along a planned transit route from the origin to the destination, wherein the predicted weather conditions correspond to respective times that the enclosure is predicted to be located at the respective locations; and
based on the model, predictively determining control parameters for a heater of the enclosure configured to cause the enclosure to reach the desired destination temperature at or before a time of arrival at the destination.

16. The article of claim 15, wherein the one or more environmental sensors includes a temperature sensor.

17. The article of claim 15, wherein the one or more environmental sensors includes a humidity sensor.

18. The article of claim 15, wherein the code is further executable for receiving updated weather data and updating the model based on the updated weather data.

19. The article of claim 15, wherein the code is further executable for receiving traffic data and updating the model based on the traffic data.

20. The article of claim 15, wherein the predictively determining the control parameters includes determining a time at which to activate the heater.

* * * * *